United States Patent [19]

Dasgupta et al.

[11] Patent Number: 5,656,699
[45] Date of Patent: Aug. 12, 1997

[54] OLIGOAMIDE-EPICHLOROHYDRIN RESINS AS DRAINAGE AIDS

[75] Inventors: Sunil Priya Dasgupta; Herbert Hastings Espy, both of Wilmington, Del.

[73] Assignee: Hercules Incorporated, Wilmington, Del.

[21] Appl. No.: 229,254

[22] Filed: Apr. 18, 1994

[51] Int. Cl.$^6$ .................................................. C08L 77/00
[52] U.S. Cl. ....................... 525/430; 524/538; 525/420; 525/435; 525/436
[58] Field of Search ........................... 525/420, 430, 525/435, 436; 524/538

[56] References Cited

U.S. PATENT DOCUMENTS

| | | | |
|---|---|---|---|
| 2,926,116 | 2/1960 | Keim | 162/164 |
| 2,926,154 | 2/1960 | Keim | 260/29.2 |
| 3,632,559 | 1/1972 | Matter et al. | 260/78 |
| 3,642,572 | 2/1972 | Endres et al. | 162/164 |
| 3,891,589 | 6/1975 | Ray-Chaudhuri | 260/29.2 |
| 3,893,885 | 7/1975 | Ziemann et al. | 162/164 |
| 3,932,363 | 1/1976 | Lehmann et al. | 260/78 |
| 3,945,983 | 3/1976 | Hoppe et al. | 260/78 |
| 4,036,821 | 7/1977 | Hoppe et al. | 260/78 |
| 4,052,259 | 10/1977 | Hoppe et al. | 162/164 |
| 4,348,514 | 9/1982 | Lobach et al. | 528/367 |
| 4,384,110 | 5/1983 | Lobach et al. | 528/323 |

FOREIGN PATENT DOCUMENTS

| | | |
|---|---|---|
| 0002475 | 2/1981 | European Pat. Off. . |
| 2114954 | of 0000 | France . |
| 2158199 | of 0000 | Germany . |

Primary Examiner—Ana Woodward
Attorney, Agent, or Firm—Ivan G. Szanto; Roy V. Jackson

[57] ABSTRACT

A water-soluble drainage-aid composition which is the reaction product of a bifunctional crosslinking agent which may be an epihalohydrin selected from the group consisting of epichlorohydrin or epibromohydrin, a 1,3-dihalo-2-propanol in which "halo" is chloro- or bromo-, or a glycidyl ester of an alkanesulfonic or arenesulfonic acid, and an oligoamide reaction product of a polyalkylene polyamine with a carboxylic acid selected from the group consisting of dicarboxylic acids containing between 5 and 10 carbons and their acyl halides, amides, and esters of alcohols having up to 6 carbon atoms, and tricarboxylic acids containing between 6 and 10 carbon atoms and their acyl halides, amides, and esters of alcohols having up to 6 carbon atoms, with a mole ratio of polyamine to dicarboxylic acid or its functional derivative between 1.5/1 and 2/1 or a mole ratio of polyamine to tricarboxylic acid or its functional derivative of 3/1, the oligoamide reaction product being an amine-terminated oligo(aminoamide) having an average composition of at least two amide groups and at least four amine groups per molecule, the bifunctional crosslinking agent being used a level of between 1.5 and 2.5 moles per mole of oligoamide; a method for making the water-soluble drainage-aid composition, and a method for using the water-soluble drainage-aid composition as a dewatering aid in paper manufacture.

7 Claims, No Drawings

OLIGOAMIDE-EPICHLOROHYDRIN RESINS AS DRAINAGE AIDS

This invention relates to a drainage-aid composition and method for facilitating drainage of water from paper pulp in paper-making processes, and paper made using the composition or method.

BACKGROUND OF THE INVENTION

The formation of paper from fiber-water slurry involves the drainage of process water on a continuously moving wire screen, dewatering by pressing the wet webs between felts and pressing between a series of heated drums. The rate of paper production depends on how efficiently the water is removed from the webs during this process without affecting the formation or physical properties of the sheets. To achieve this objective water-soluble polymeric chemicals, which are mainly flocculants by nature, are used in the papermaking process. These chemicals are referred to as drainage aids. The drainage aids accelerate or extend the dewatering of pulp during paper and board manufacture.

Because of the decreased availability of natural papermaking pulp and the general move toward recycling waste, the utilization of recycled used paper and ground hard wood pulps for newsprint and other types of paper has increased, together with the need for drainage aids. The resins of the present invention differ in having a polyamine/diacid mole ratio between 1.5 and 2.0 to 1.

U.S. Pat. Nos. 2,926,116 and 2,926,154, both to G. I. Keim, describe poly(aminoamides) from polyalkylenepolyamines and dicarboxylic acids, with polyamine/diacid mole ratio between ca. 0.8 and ca. 1.4 to 1. These are alkylated and cross-linked with epichlorohydrin, at an epichlorohydrin/secondary amine mole ratio between 0.5 and 1.8 to 1.

U.S. Pat. No. 3,632,559 to M. Matter et al. describes aminopolyamides with adipic acid/polyalkylenepolyamine mole ratios between 0.85 & 1.2 [whence, amine/acid between 1.176 and 0.833]. These are cross-linked by precondensation products of x moles dimethylamine and x+1 moles epichlorohydrin, having the formula:

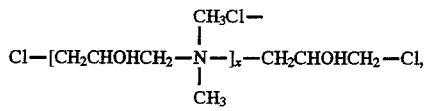

using low mole ratios of this cross-linker to secondary amine in the polyamide.

The prepolymers of Matter et al. must be polyamides, or oligoamides of at least five (polyamine-dibasic acid) repeat units; whereas, the amine/acid ratios of the resins of the present invention (where based on dicarboxylic acids) would give oligomers averaging not over two repeat units.

U.S. Pat. No. 3,891,589 to D. K. Ray-Chaudhuri discloses in column 2 polyamide-polyamine-epichlorohydrin resins in which the mole ratio of polyamine to carboxylic acid can range between 0.9 and 1.5 and the number of moles of epichlorohydrin per equivalent weight of polyamide-polyamine intermediate can range from 1.25 to 4.0. At a polyamine/dicarboxylic acid ratio of 1.5 (=3:2), the average molecule will contain 3 polyamine moieties and 2 acid moieties. This may be viewed as "two repeat units plus an extra polyamine end-group", or as having three of the secondary amines that characterize a repeat unit. At a polyamine/diacid mole ratio of 1.5/1, the resins of the present invention contain between 0.75 and 1.2 moles of bifunctional crosslinking agent per repeat unit of oligoamine precursor, or between 0.50 and 0.83 mole of linking agent per secondary amine equivalent.

SUMMARY OF THE INVENTION

The composition according to the invention comprises the reaction product of a bifunctional crosslinking agent, which may be an epihalohydrin selected from the group consisting of epichlorohydrin or epibromohydrin, a 1,3-dihalo-2-propanol in which "halo" is chloro- or bromo-, or a glycidyl ester of an alkanesulfonic or arenesulfonic acid, and an oligoamide reaction product of a polyalkylene polyamine with a carboxylic acid selected from the group consisting of dicarboxylic acids containing between 5 and 10 carbons and their functional derivatives including acyl halides, amides, and esters of alcohols having up to 6 carbon atoms, and tricarboxylic acids containing between 6 and 10 carbon atoms and their said functional derivatives, with a mole ratio of polyamine to dicarboxylic acid (or its functional derivative) between 1.5/1 and 2/1 or a mole ratio of polyamine to tricarboxylic acid (or its functional derivative) of 3/1, the oligoamide reaction product being an amine-terminated oligo(aminoamide) having an average composition of at least two amide groups and at least four amine groups per molecule.

Oligoamides of dibasic acids and polyalkylenepolyamines are made by heating a dibasic acid or ester with excess polyalkylenepolyamine. The resulting amine-terminated oligoamides are crosslinked with minimal amounts of epichlorohydrin, i.e., 1 equivalent of epi per formula weight of oligoamide, plus the minimal additional epi needed to crosslink the resin to a substantial molecular weight.

Preferably, the bifunctional crosslinking agent is epichlorohydrin, whereas the amine/acid ratios of the resins of the present invention (where based on dicarboxylic acids) would give oligomers averaging not over two repeat units.

Also preferably, the polyalkylene amine is diethylene triamine, and further, it is preferred that the dicarboxylic acid be selected from the group consisting of adipic acid and its methyl ester and glutaric acid and its methyl ester. Most preferably, the bifunctional crosslinking agent is epichlorohydrin, the polyalkylene amine is diethylene triamine, and the dicarboxylic acid is selected from the said group of acids and their methyl esters.

The invention also comprises a method of making a water-soluble drainage-aid composition including the steps of (1) heating in aqueous solution a carboxylic acid selected from the group consisting of dicarboxylic acids containing between 5 and 10 carbons and their functional derivatives having up to 6 carbon atoms and a tricarboxylic acid containing between 6 and 10 carbon atoms and its functional derivatives having up to 6 carbon atoms, the mole ratio of polyamine to dicarboxylic acid or derivative of between 1.5/1 to 2/1 or at a mole ratio of polyamine to tricarboxylic acid or derivative of 3/1; (2) adding at least one equivalent and up to 2.5 equivalents of a bifunctional alkylating agent selected from the group consisting of from an epihalohydrin, a 1,3-dihalo-2-propanol, and an alkyl- or arylsulfonate ester of glycidyl alcohol to chain-link the oligo(aminoamide) reaction product with one equivalent of the bifunctional alkylating agent, and (3) cross-linking the chain-linked product with an excess over one equivalent of the bifunctional alkylating agent to increase the molecular weight of the chain-linked oligo(aminoamide), whereby the viscosity of the aqueous reaction medium is increased.

Preferably, the excess bifunctional alkylating agent should not be enough to contribute an undesirable level of additional wet strength to paper that contains the composition.

The invention also comprises a method of using a water-soluble drainage-aid composition according to the invention as a dewatering aid in paper manufacture, the bifunctional crosslinking agent being used a level of between 1.5 and 2.5 moles per mole of oligoamide, and the oligoamide being an amine-terminated oligo(aminoamide) having an average composition of at least two amide groups and at least four amine groups per molecule.

DETAILED DESCRIPTION OF THE INVENTION

The initial oligo(aminoamides) are made by heating one of: (a) a dicarboxylic acid containing between 5 and 10 carbon atoms, or (b) a tricarboxylic acid containing between 6 and 10 carbon atoms, or a functional derivative of either, namely an amide, acyl halide, or ester of an alcohol having up to 6 carbon atoms with a molar excess of a polyalkylene polyamine to make an amine-terminated oligo(aminoamide) having an average composition of at least two amide groups and at least four amine groups per molecule. The starting oligo(aminoamides) should contain at least two amide groups and at least four equivalents of amine nitrogen (primary and secondary amine collectively) per formula weight of oligo(aminoamide). They may be derived from:

(1) a saturated aliphatic, unsaturated aliphatic, or aromatic dicarboxylic acid containing 5–10 carbon atoms, reacted with a polyalkylenepolyamine at a polyamine/dicarboxylic acid mole ratio between 1.5 and 2.0 to 1, or, (2) an aliphatic or aromatic tricarboxylic acid containing 6–10 total carbon atoms, reacted with a polyalkylenepolyamine at a polyamine/dicarboxylic acid mole ratio of about 3 to 1.

For the preparation of oligo(aminoamides) of type (1), suitable acids include glutaric, itaconic, adipic, pimelic, suberic, azelaic, sebacic, phthalic, isophthalic, terephthalic, and the like. Preferred are glutaric and adipic acids. For the preparation of oligo(aminoamides) of type (2), suitable tricarboxylic acids include citric, aconitic, propane-1,2,3-tricarboxylic, benzene-1,2,4-tricarboxylic, benzene-1,3,5-tricarboxylic, and the like. Benzene-1,2,4-tricarboxylic acid is preferred. In the preparation of oligo(aminoamides) of either type, functional equivalents such as acyl halides, amides, or lower alkyl esters (esters derived from alcohols of up to 6 carbons) may be substituted for the acids.

The polyalkylenepolyamines have the general formula: $H-[NH-(CH_2)_m-]_n-NH_2$, in which "m" is 2 or 3, and "n" is between 2 and 5. Suitable polyalkylenepolyamines include diethylenetriamine, triethylenetetramine, tetraethylenepentamine, iminobis(3-aminopropyl)amine, N,N'-bis(2-aminoethyl)-1,3-propanediamine, N,N'-bis(3-aminopropyl)-1,2-diaminoethane, and the like. Polyamines with m=2, and/or n=2 or 3, are preferred. Most preferred are diethylenetriamine and triethylenetetramine.

The general formula of oligo(aminoamides) of type (1) is:

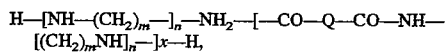

where Q=$C_3$–$C_8$ alkylene, $C_3$–$C_8$-alkenylene, or $C_6$–$C_8$ arylene, and "m" and "n" have their numerical values above. "x" may be between 2 and 3.

The general formula of oligo(aminoamides) of type (2) is:

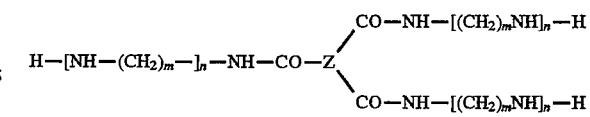

where Z ranges between $C_3H_5$ and $C_7H_{13}$ (if aliphatic), or $C_6H_3$ and $C_7H_5$ (if aromatic).

The amines and acids (or acid derivatives) can be converted to amides simply by heating. Temperatures between about 130° C. and about 250° C. are usually suitable, with 150° C. to 190° C. being preferred. Heating is continued until evolution of water (or alcohol, starting with esters) is substantially complete. The product may be diluted with water and added as a solution in subsequent process steps, or the molten oligo(aminoamide) may be cooled directly and handled as a 100% material.

The chain-linking/cross-linking agent is an epihalohydrin selected from among epichlorohydrin or epibromohydrin, a 1,3-dihalo-2-propanol in which "halo" is chloro- or bromo-, or a glycidyl ester of an alkanesulfonic or arenesulfonic acid,

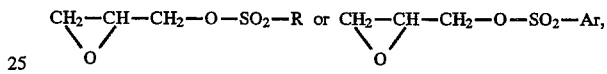

where R=$C_1$ to $C_4$ alkyl, and Ar=phenyl or p-tolyl. Epichlorohydrin is preferred.

The amount of additional bifunctional agent is sufficient to cross-link the starting oligo(aminoamide) to the desired molecular weight in aqueous solution, without introducing enough reactive functional groups to contribute an undesirable level of additional wet strength to paper that contains the composition.

The mole ratio of linking agent to oligo(aminoamide) is between about 1.5 and about 2.5. Theoretically, 1.0 mole of linker is needed to connect the oligo(aminoamides) into a chain. The remaining amount cross-links the chains, will depend on the particular oligo(aminoamide) and reaction conditions, and may be determined readily by experiment for any given oligo(aminoamide).

The reaction of the oligo(aminoamide) with linking agent is performed in aqueous solution, usually between ca. 10% and ca. 60% (by weight) of the active ingredients oligo (aminoamide) plus linking agent. The linking agent is added to an aqueous solution of the oligo(aminoamide), with cooling, if needed, to control any initial exotherm. The reaction is continued until a substantial increase in solution viscosity indicates that cross-linking has occurred.

The cross-linking reaction may be carried out in one or more stages. In single-stage operation, the reaction is quenched after the desired reaction mixture viscosity is first reached. In multi-stage operation, after the first target viscosity is reached, dilution water may be added, and the mixture reacted further at lower concentration until it has thickened again to a desired target viscosity. This cycle of dilution and re-thickening may be repeated as many times as desired to reach a product of the desired viscosity at a given solids content, the viscosity being a measure of average molecular weight. The linking agent may be added all in one portion, or in an initial portion to initiate viscosity increase, and such additional portions, as needed, to maintain the rate of thickening, within the overall total mole ratios of linking agent to oligo(aminoamide).

In the oligo(aminoamide)-epichlorohydrin reaction, a mixture of water and a water-miscible co-solvent may be used in place of water if desired. Suitable co-solvents can include water-miscible $C_1$–$C_4$ alcohols, tetrahydrofuran, dioxane, ethylene glycol, propylene glycol, diethylene glycol, dipropylene glycol or lower alkyl ethers of these glycols, etc.

The reaction temperature depends on the concentration of reactants and can be determined readily one skilled in the art by experiment for any given composition. Preferably, it is between 10° C. and 90° C., more preferably between 50° C. and 75° C., the latter permitting best control of the reaction.

At a desired target viscosity, indicating a desired average molecular weight, the cross-linking reaction can be arrested by cooling and dilution, and/or acidifying to a pH low enough to prevent gelation in storage. Other stabilizers such as biocides may be added as desired.

The resins are used by adding them to paper stock in aqueous dispersion, before it is formed into a sheet on the paper machine. The resin may be further diluted with water, if desired, for better mixing with the paper stock. The resins may be added at a refining stage, at the headbox, or in between. As much may be added as needed to realize a desired improvement of dewatering rate. Preferably, the addition level is between 0.05% and 1.0% resin solids, based on dry weight of cellulose.

The compositions according to the invention may be used in pulps made by standard pulping processes such as kraft, sulfite, semichemical, thermomechanical, chemithermomechanical, etc., and in virgin or reclaimed paper stock.

(A). Schopper Riegler (S-R) freenes procedures used In screening processess test:

1. Place enough dilute stock in the designated graduated cylinder (1000 mL) to make a two gram dry hand sheet ±0.2 grams.
2. Fill cylinder to the 1000 mL mark with the same type of 25° C. water used in the beaten pulp.
3. Mix stock by pouring from one cylinder to another three times (avoid mixing air into the stock).
4. Pour the stock gently into the closed Schopper-Riegler chamber.
5. Place the empty one liter graduated cylinder under the overflow orifice and release center stopper by holding down the lever.
6. When the water stops flowing from the overflow orifice, read the volume of water in the cylinder to the nearest ml.
7. Remove chamber from instrument, rinse out pulp cake with water, make a handsheet from the fibers, dry and record weight.
8. Take final weight of dry hand sheet and add one ml for each 0.01 gram that the sheet is over two grams or subtract one ml for each 0.01 gram under two grams from the reading taken in step six.

(B). Vacuum aided drainage apparatus (VADA):
The apparatus consists of the following:
1. 2 Buchner flasks, about 1000 mL in size.
2. A Hartley type funnel, 12.5 cm diameter, 530 mL volume reservoir with an perforated acrylic plate.
3. A balance accurate to 0.001 g.
4. A stopclock accurate to 0.1 sec.
5. Filter paper, Whatman type 541.
6. Laboratory vacuum pump.
7. Fan assisted air driven oven.

The VADA testing procedure measures the essential property of drainage rate as the time in seconds to dewater 250 mL of 0.25 percent stock suspension under vacuum.

The extent of vacuum attained during the dewatering process is an indicator of sheet formation.
(C.) VADA procedure used:

1. Dry some filter papers and weigh individually to nearest 0.001 g.
2. Adjust consistency of the stock to give a dry pad weight of 0.625 g per 250 ml of stock, this is equivalent to 65 $g/m^2$ sheet weight.
3. Wet a filter paper and place the filter paper in the Hartley funnel between the acrylic plate and the reservoir; ensure that all the clips are secure and that the filter is horizontal so the stock will drain uniformly.
4. Turn on the vacuum pump, close the valve to atmosphere and draw off the excess moisture. Leave the pump running and open the valve to atmosphere.
5. Measure out 250 ml of stock and without allowing it to settle, several inversions of the cylinder are sufficient, simultaneously close the valve to atmosphere, pour the stock onto the filter and start the stopclock.
6. Stop the stopclock when the pulp pads surface appears dry, i.e., changes appearance from glossy to matt.
7. If additives are to be evaluated they should be well mixed with the stock and tested immediately with the minimum time delay.
8. The indicated vacuum will reach a maximum (note this reading), then fall to a lower but stable level (note this reading).
9. Turn off the pump, remove the filter paper plus fibre pad, weigh, to the nearest 0.001 g, then dry in oven.
10. Weigh the dried pad to 0.001 g, empty the one liter flask after each test.
11. Do five replicate determinations on each sample, with a minimum of three if the sample size is restricted.

(D). Machine trials:

Paper was formed from a 50:50 blend of bleached hardwood kraft and bleached softwood kraft pulp, at about 500 mL Canadian standard freeness, on a pilot-sized Fourdrinier paper machine operating at about 42 meters per minute. Sheet weight was about 65 grams per square meter. Dilute solutions of experimental drainage aids were added to the stock before it entered the headbox. As the resin dose rate was varied, the distance of the wet line from the headbox was measured. The wet line is the demarcation between a glossy surface and a matte surface of the pulp on the Fourdrinier wire, indicating drainage of the surface water through the fiber mat. Samples of the treated pulp were also taken for freeness measurement.

The following tables of experiments include examples according to this invention. The experiments are arranged with the procedures for making precursors presented first, followed by a table showing the resulting resin composition according to the invention. The concluding tables show the freeness results using the Schopper-Riegler method as well as the dewatering time using the Vacuum Aided Drainage Apparatus, and measurements of drainage during a machine trial.

Attachment 1

Preparation of Oligoamide Precursors—Examples A—M

General Procedure:

To a conventional round bottom flask containing a stirrer, a thermometer and a Dean-Stark water trap, was first added the amine and then the acid or ester. The mixture was then heated between 2 and 4 hours at the indicated temperature and then cooled. In some runs the product oligoamide was diluted with water. When itaconic acid was used, it was necessary to carry out the reaction in aqueous solution in order to control the reaction exotherm. The water was removed by distillation during the reaction.

Abbreviations:
DETA=diethylenetriamine
TETA=triethylenetetramine
TEPA=tetraethylenepentamine
TAEA=tris(s-aminoethyl)amine
AA=adipic acid
GA=glutaric acid
IA=itaconic acid
DMI=dimethylisophthalate
TMB=trimethyl-1,2,4-benzenetrisarboxylate
DMG=dimethylglutarate Example, with the last crosslinking reaction stage being run at a reactant concentration between 20 and 30% by weight of reaction mixture. If necessary to maintain the progress of viscosity increase, additional portions of epi were added (0.05 to 0.1 mole per mole of oligoamide) during the second or later stages of crosslinking. When the desired Gardner-Holdt viscosity was reached during the last crosslinking stage, the reaction was quenched with additional water and then stabilized with sulfuric acid to the desired pH.

| Example | Acid | Amine | Amine/Acid Mole Ratio | Reaction T, °C. | Reaction Time (hrs) | Dilution Water, g | Solids, % |
|---|---|---|---|---|---|---|---|
| A | AA, 146.2 g | DETA, 154.8 g | 1.5 | 170 | 2.6 | None | 100 |
| B | AA, 438.2 g | DETA, 464.4 g | 1.5 | 170 | 3.0 | 750 | 49.4 |
| C | DMG, 160.2 g | DETA, 154.8 g | 1.5 | 170 | 2.1 | None | 100 |
| D | GA, 132.1 g | DETA, 154.8 g | 1.5 | 168–172 | 2.0 | 200 | 55 |
| E | DMG, 480.3 g | DETA, 464.4 g | 1.5 | 100–153 | 4.1 | 700 | 52.5 |
| F | IA, 130.1 g | DETA, 154.8 g | 1.5 | 170 | 2.0 | None | 100 |
| G | DMI, 194.2 g | DETA, 154.8 g | 1.5 | 168–174 | 1.1 | None | 100 |
| H | DMI, 123.0 g | DETA, 137.5 g | 2.1 | 170–173 | 1.2 | None | 100 |
| I | AA, 146.1 g | TETA, 219.4 g | 1.5 | 173 | 2.0 | 300 | 45.6 |
| J | AA, 146.1 g | TEPA, 284.0 g | 1.5 | 171–175 | 2.6 | None | 100 |
| K | GA, 132.2 g | TETA, 219.4 g | 1.5 | 170–176 | 2.0 | 300 | 46.4 |
| L | TMB, 1216.1 g | TETA, 219.2 g | 3.0 | 170 | 2.8 | None | 100 |
| M | AA, 146.2 g | DETA, 206.3 g | 2.0 | 169–171 | 2.0 | None | 100 |

Preparation of Oligoamide-Epichlorohydrin (Epi) Resins—Examples 1–13

General Procedure:

The oligoamide was dissolved in water and treated with epichlorohydrin (epi) (generally 1 mole per mole of oligoamide). Sufficient water was used to give a reactant (oligoamide+epi) concentration between 50% and 60% by weight of total mixture. The crosslinking reaction allowed to proceed at temperatures between about 50° C. and about 85° C. until the mixture had reached a Gardner-Holdt viscosity of "T" or higher (as measured on a sample cooled to 25° C.). The mixture was then diluted with additional water, and usually treated with a second portion of epi (generally 0.3 mole per mole of oligoamide). The crosslinking reaction was continued until the Gardner-Holdt viscosity again reached "T" or above. Between two and five such serial stages of crosslinking and dilution were carried out with each Typical Procedure

EXAMPLE 1

Oligoamide A, 52.9 g, was dissolved in 62.2 g of water. To the solution maintained at 70° C. was added 9.25 g. of epichlorohydrin. After 40 min the Gardner-Holdt (G-H) viscosity was I. An additional 38 g of water and 4.63 g of epichlorohydrin were added and the reaction allowed to proceed for 106 min at the end of which time the G-H viscosity was P. An additional 54.1 g of water was added, and after 46 more rain at 70° C. the G-H viscosity was Q. An additional 43.3 g of water was added, and 4 min later the G-H viscosity was S. Six min after an additional 64.9 g of water was added the G-H viscosity was J. At this point, 314 g of water was added to quench the reaction, and 9.8 g of concentrated sulfuric acid was added to adjust the pH to 5.2. The total solids of the final solution was 11.8%, and the Brookfield viscosity was determined to be 49 cps.

| Example No. | Amide Precursor | Ingredient Weights, g | | | Reaction Conditions | | | Product | |
|---|---|---|---|---|---|---|---|---|---|
| | | Total Water | Amide | Epi | Temp. °C. | Time, min | pH | Total Solids, % | Visc., cps. |
| 1 | A | 576.5 | 52.9 | 13.9 | 63–70 | 202 | 5.2 | 11.8 | 49 |
| 2 | B | 3865.5 | 344.3 | 102.2 | 60–70 | 273 | 3 | 12.4 | 116 |
| 3 | C | 551.5 | 50.2 | 13.9 | 66–71 | 289 | 4.2 | 10.9 | 78.5 |
| 4 | E | 3634.0 | 326.6 | 134.4 | 60–73 | 295 | 3.0 | 13.6 | 95 |
| 5 | F | 537.9 | 49.8 | 14.8 | 66–85 | 328 | 5.2 | 12.1 | 86 |
| 6 | G | 375.3 | 57.0 | 15.3 | 64–70 | 698 | 5.0 | 9.4* | 26 |
| 7 | I | 531.0 | 65.9 | 18.7 | 52–70 | 436 | 5.0 | 6.2* | 71 |
| 8 | J | 609.5 | 59.1 | 13.8 | 59–78 | 205 | 4.0 | 6.8* | 18 |
| 9 | K | 602.9 | 63.1 | 15.9 | 60–70 | 362 | 5.0 | 6.1* | 73 |
| 10 | L | 396.3 | 119.0 | 57.7 | 70–80 | 414 | 5.0 | 16.8* | 38 |
| 11 | M | 245.4 | 63.3 | 30.1 | 68–79 | 469 | 5.0 | 12.6* | 45 |
| 12 | D | 256.2 | 50.2 | 14.8 | 64–78 | 226 | 5.0 | 6.0* | 58 |
| 13 | H | 411.6 | 31.4 | 15.2 | 69–72 | 430 | 4.0 | 11.9 | 32 |

*Final product diluted 1/1 with water before measurement of solids and viscosity The resins of Examples 1–10 were tested as drainage aids using one or more of three different evaluation procedures: (A) the Schopper Riegler (S-R) Freeness Test; the vacuum aided drainage apparatus (VADA); (C) sheet formation on a pilot plant paper machine. The procedures for each of these tests are described in the Disclosure of Invention. For the S-R test, higher values correspond to better performance. For the VADA test lower values correspond to better performance. For the evaluations on the paper machine, higher values of Canadian standard freeness (CSF) and lower distances of the wet line from the headbox represent better performance.

Evaluation of Resins Utilizing the S-R Freeness Test

| | S-R Freeness, ml. | | |
|---|---|---|---|
| Example | Control, No Resin | Resin at 0.1% dry pulp basis | Resin at 0.5% dry pulp basis |

Pulp Furnish: Newsblank, No Alum

| | | | |
|---|---|---|---|
| 1 | 194 | 363 | 655 |
| 3 | 194 | 379 | 649 |
| 5 | 194 | 327 | 582 |
| 6 | 154 | 151 | 490 |
| 10 | 154 | — | 490 |
| 9 | 133 | 175 | 235 |
| 11 | 154 | 244 | 576 |

| Example | Control, No Resin | Resin at 0.05% dry pulp basis | Resin at 0.1% dry pulp basis |
|---|---|---|---|

Pulp Furnish: Newsblank, 1% Alum, pH 6

| | | | |
|---|---|---|---|
| 1 | 192 | 332 | 402 |
| 3 | 192 | 328 | 386 |
| 5 | 192 | 278 | 373 |

Pulp Furnish: 10% Bleached Softwood Kraft, 10% Bleached Hardwood Kraft, 10% Unbleached Softwood Kraft, 70% Repulped Newspapers

| | | | |
|---|---|---|---|
| 13 | 340 | 350 | 420 |

Evaluation of Resins Utilizing the Vacuum Aided Drainage Apparatus

| | Dewatering Time, seconds | | | |
|---|---|---|---|---|
| Example | Resin at 0.03% Dry Pulp Basis | Resin at 0.05% Dry Pulp Basis | Resin at 0.10% Dry Pulp Basis | Resin at 0.15% Dry Pulp Basis |

Pulp Furnish: Newsprint Blank Stock, No Alum, pH 8.3
Control: No Resin, 29.3 sec

| | | | | |
|---|---|---|---|---|
| 1 | 28 | 23 | 16.5 | — |
| 3 | 28.5 | 23.2 | 15.5 | — |
| 5 | 28.4 | 25.2 | 17 | — |
| 12 | — | 23.2 | 17 | 15 |

Pulp Furnish: Newsprint Blank Stock, 1% Alum, pH 6
Control: No resin, 23.1 sec

| | | | | |
|---|---|---|---|---|
| 12 | 20.5 | 16.2 | 15 | 13 |
| 1 | 21.6 | 18.5 | 15.8 | 14 |
| 3 | 18 | 16.8 | 15.2 | 14 |
| 7 | 18.9 | 17.8 | 15 | 13.8 |

Evaluation of Resins Utilizing a Pilot Paper Machine

| Example | % Resin, Dry Pulp Basis | Modified CSF (ml)[a] | Wet Line, Inches from Headbox |
|---|---|---|---|
| 2 | None | 165 | 80 |
| | 0.05 | 230 | 71 |
| | 0.10 | 275 | 57 |
| | 0.20 | 320 | 46 |
| 4 | None | 175 | 80 |
| | 0.05 | 220 | 64 |
| | 0.10 | 270 | 53 |
| | 0.20 | 325 | 43 |

(a) 500 ml headbox stock diluted to 1 liter with tap water. Stock consistency 0.45%

We claim:

1. A water soluble drainage-aid composition for facilitating drainage of water from paper pulp in paper-making processes, which is the reaction product of (a) a bifunctional crosslinking agent which is selected from the group consisting of a 1,3-dihalo-2-propanol in which "halo" is chloro- or bromo-, a glycidyl ester of an alkanesulfonic or arenesulfonic acid, and an epihalohydrin selected from the group consisting of epichlorohydrin and epibromohydrin, and (b), an oligoamide reaction product of a polyalkylene polyamine with a carboxylic acid or carboxylic acid derivative selected from the group consisting of dicarboxylic acids containing between 5 and 10 carbons and their acyl halides, amides and esters of alcohols having up to 6 carbon atoms, and tricarboxylic acids containing between 6 and 10 carbon atoms and their acyl halides, amides, and esters of alcohols having up to 6 carbon atoms, with a mole ratio of polyamine to dicarboxylic acid or dicarboxylic acid derivative between 1.5/1 and 2/1 or a mole ratio of polyamine to tricarboxylic acid or tricarboxylic acid derivative of 3/1, and a mole ratio of crosslinking agent to oligoamide of from about 1.5/1 to about 2.5/1, the oligoamide reaction product being an amine-terminated oligo(aminoamide) having an average composition of at least two amide groups and at least four amine groups per molecule.

2. The water-soluble drainage-aid composition as claimed in claim 1, in which the bifunctional crosslinking agent is epichlorohydrin.

3. The water-soluble drainage-aid composition as claimed in claim 1, in which the polyalkylene amine is diethylene triamine.

4. The water-soluble drainage-aid composition as claimed in claim 1, in which the dicarboxylic acid is selected from the group consisting of adipic acid and its methyl ester and glutaric acid and its methyl ester.

5. The water-soluble drainage-aid composition as claimed in claim 1, in which the bifunctional crosslinking agent is epichlorohydrin, the polyalkylene amine is diethylene triamine, and the dicarboxylic acid is adipic acid.

6. The method of making a water-soluble drainage-aid composition including the steps of (1) heating a carboxylic acid selected from the group consisting of dicarboxylic acids containing between 5 and 10 carbons and their esters and tricarboxylic acids containing between 6 and 10 carbon atoms and their esters, with a polyalkylene polyamine at a mole ratio of polyamine to dicarboxylic acid or ester of between 1.5/1 to 2/1 or at a mole ratio of polyamine to tricarboxylic acid or ester of 3/1 to form an oligo (aminoamide) reaction product; and (2) heating an aqueous solution of said oligo(aminoamide) reaction product with from about 1.5 to about 2.5 moles, per mole of oligo (aminoamide), of a bifunctional alkylating agent selected from the group consisting of an epihalohydrin, a 1,3-di-halo-2-propanol, and an alkyl- or arylsulfonate ester of glycidyl alcohol to chain-link the oligo(aminoamide) reaction product and to cross-link the chain-linked product to increase the molecular weight of the chain-linked oligo(aminoamide), whereby the viscosity of the aqueous reaction medium is increased.

7. The method of making a water-soluble drainage-aid composition as claimed in claim 6, in which the amount of the bifunctional alkylating agent is insufficient to introduce enough reactive functional groups to substantially increase wet strength.

* * * * *

UNITED STATES PATENT AND TRADEMARK OFFICE
CERTIFICATE OF CORRECTION

PATENT NO. : 5,656,699

DATED : August 12, 1997

INVENTOR(S) : Sunil Priya Dasgupta and Herbert Hastings Espy

It is certified that error appears in the above-identified patent and that said Letters Patent is hereby corrected as shown below:

Column 7, line 27, Example 7 "1216.1 g should be --126.1--

Column 8, line 39, "rain" should read --min--

Column 8, line 61, "396.3" should read --398.3--

Column 9, line 28, "490" should read --266--

Signed and Sealed this

Third Day of February, 1998

BRUCE LEHMAN

Attest:

Attesting Officer

Commissioner of Patents and Trademarks